2,861,969
Patented Nov. 25, 1958

2,861,969

COMPOSITIONS COMPRISING A POLYESTER AND 1,1,1-TRICHLORO-3-NITRO-2-PROPANOL AND PROCESS OF PREPARING SAME

Hobson D. De Witt and Arthur B. Beindorff, Decatur, Ala., assignors to The Chemstrand Corporation, Decatur, Ala., a corporation of Delaware No Drawing. Application March 23, 1955
Serial No. 496,341

18 Claims. (Cl. 260—31.2)

This invention relates to new compositions of matter, and more particularly, to new and useful compositions of matter comprising solutions or "dopes" of synthetic linear condensation polymers or polyesters. The invention is further concerned with new compositions of matter which are readily capable of being formed into useful shaped articles, such as films, fibers, filaments, bristles, foils, ribbons, and the like.

The synthetic linear condensation polyesters, which have become extremely valuable from a commercial standpoint, contemplated in the practice of the present invention are those formed from dibasic acids and glycols. When these polyesters are in a highly polymerized condition, they can be formed into filaments, and the like, which can be permanently oriented by cold-drawing. Specifically, the polyesters useful in the instant invention are those obtained by heating one or more glycols of the series $HO(CH_2)_nOH$, where $n$ is an integer greater than one but not exceeding 10, with a dibasic acid, such as terephthalic acid or an ester-forming derivative thereof.

Examples of the ester-forming derivatives of terephthalic acid are its aliphatic, including cycloaliphatic, and aryl esters and half esters, its acid halides and its ammonium and amine salts. Examples of the glycols are ethylene, trimethylene, tetramethylene, and decamethylene glycols. Various dibasic acids, other than terephthalic acid, may be employed, such as isophthalic acid, 4,4'-diphenyldicarboxylic acid, p-carboxyphenoxyacetic acid, succinic acid, etc. However, of all the polymeric esters, polyethylene terephthalate is preferred because of the ready availability of terephthalic acid and ethylene glycol, from which it is made, and also because of its high melting point which is about 240° C. The high melting point is particularly desirable in the manufacture of filaments for textile uses.

For the sake of simplicity of description, the present invention will be described as it is applicable to the use of the instant new compositions in the manufacture of filaments and fibers. The invention is not to be limited thereby but only in so far as the same may be limited by the appended claims.

Various methods are employed for converting the polyesters, described hereinbefore, into filaments and fibers, such as melt-spinning, dry-spinning and wet-spinning. The melt-spinning method has been most frequently employed comprising melting chips of the polyester on a heated grid, preferably passing the melt through a filter bed made up of a number of small particles, such as sand, forcing it through a spinneret and cooling the filaments so formed. However, melt-spinning has certain disadvantages. For example, high temperatures must be employed which makes the addition of plasticizers and other modifying agents difficult, since there is a tendency toward discoloration and decomposition of the added agent due to the high temperature.

The wet-spinning technique, wherein a solution of the polyester is extruded into a bath comprising a non-solvent for the polyester, has a number of advantages over the melt-spinning technique. For example, the wet-spinning method is generally more economical and can be operated at lower temperatures than melt-spinning. Because of the lower temperatures, plasticizers and other modifying agents can be more advantageously added to a solution rather than to a molten polyester, thereby minimizing the tendency toward discoloration and decomposition. Further, there is a tendency with certain types of plasticizers and modifying agents to be less compatible at the high temperatures required for blending in a melt, whereas they can be readily incorporated in a polyester solution at a low temperature. A still further advantage in the use of solutions lies in the ease with which they can be cast into films or coatings of uniform thickness, which is mechanically more difficult to accomplish with a molten composition due to its relatively high viscosity.

While, as pointed out above, the wet-spinning technique for forming shaped articles from polyesters is preferred, it has not been employed commercially due to the scarcity of solvents. Polyesters are generally insoluble in the more common organic solvents. There is a scarcity of solvents, which are suitable for the more usual types of polyesters, from the standpoints of non-corrosiveness, low-cost and solvent power, as well as from the standpoint of ease of recovery for reuse. Accordingly, a serious need has existed for the discovery of solvents with which polyester solutions of suitable concentration and stability can be prepared conveniently and economically with standard equipment, and with maximum safety both to personnel and to equipment, and which can readily and conveniently be recovered for reuse or re-cycling during the employment of the polyester solutions for transforming the polyesters into other forms, such as filaments, fibers, films, and the like.

Accordingly, the present invention has for its principal object, the preparation of polyester solutions or "dopes" which are capable of being transformed into shaped articles by the so-called wet-spinning method. Another object of the invention is to provide synthetic linear condensation polyester compositions which are stable and have non-gelation characteristics. Other objects and advantages of the instant invention will be apparent from the description thereof hereinafter.

The objects of the present invention are in general accomplished by dissolving the synthetic linear condensation polyesters in 1,1,1-trichloro-3-nitro-2-propanol or in mixtures of the same with a compound of the group of halogenated paraffin hydrocarbons containing from 1 to 6 carbon atoms, such as dibromochloromethane, dibromochloroethane, and the like; phenols, such as phenol, m-cresol, and the like; halogenated phenols, such as o-chlorophenol, and the like; and chloro- and bromo-substituted fatty acids containing from 2 to 4 carbon atoms, for example, mono-chloroacetic acid, dichloroacetic acid, mono-bromoacetic acid, alpha-mono-chloropropionic acid, $\alpha,\alpha'$-dichlorobutyric acid, $\alpha,\alpha'$-dibromopropionic acid, and the like. 1,1,1-trichloro-3-nitro-2-propanol has a boiling point in the range 116°–120° C. at 5 mm. pressure and the following structural formula:

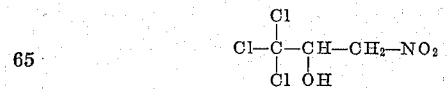

For purposes of simplicity, the 1,1,1-trichloro-3-nitro-2-propanol will be referred to throughout the remainder of the description of the invention as trichloronitropropanol.

In most cases, solutions of high solids content and good stability can be conveniently prepared by agitating the polyester or polymer with the trichloronitropropanol or mixtures thereof with halogenated paraffin hydrocarbons, or phenols, or halogenated phenols, or fatty acids, as described hereinbefore, at a temperature in the range of 50° C. up to the boiling point of the solvent or solvent mixture.

When dissolving a polyester in a solvent mixture, the trichloronitropropanol may be employed in the range of 15 to 98%, based on the weight of the total solvent, and the halogenated paraffin hydrocarbons, or phenol, or halogenated phenol, or fatty acid, in the range of 85 to 2%.

In accordance with the present invention, solutions or "dopes" containing from 5 to 30% by weight of polyester are suitable for the formation of fibers and filaments. The concentration of the polyesters which can be obtained in solution and the viscosity of the solution depend upon the nature of the polymer, the solvent employed and the temperature. Usually, when making a solution of a polyester which is to be employed in the manufacture of filaments and fibers, a polyester having a molecular weight of at least 10,000 is employed. Lower molecular weight polyesters may be employed when the solution or dope is to be used for coating or as a lacquer. While it is preferred to employ 5 to 30% by weight of polyester in the solution when forming fibers or filaments, it is to understood that less than 5% or more than 30% polyester may be used when the solution is to be employed for other purposes, such as in coating, or in lacquers, and the like, or when polyesters having a molecular weight below 10,000 are employed.

The polyesters contemplated in the practice of the present invention are those prepared from a dibasic acid, such as terephthalic acid, and a glycol, such as ethylene glycol. The reaction takes place in two stages. In the first stage, the dibasic acid and glycol are mixed together and heated in the presence or absence of esterification catalysts, as desired. At least about one molecular proportion of the glycol per molecular proportion of dibasic acid are employed, and in many cases it is desirable to employ higher proportions of the glycol relative to the dibasic acid, for example, up to five moles of glycol per mole of dibasic acid, since the initial esterification takes place more readily as a result. Water is evolved during the first stage of reaction and is continuously removed, and an intermediate product is formed which is an hydroxyalkyl derivative of the dibasic acid. The intermediate product or reaction mass is then further heated which is known as the second stage. During the second stage, glycol is liberated and the melting point and viscosity of the reaction mixture gradually increases. Length of heating determines the molecular weight and when it is desirable to produce filaments from the polyester, the heating in the second stage is continued until the melt produced has cold-drawing properties. There is a means of approximating the desirable molecular weight of the polyester which can thereafter be wet-spun into filaments in accordance with the present invention.

Polyesters produced in accordance with the methods described and claimed in copending applications of George E. Ham, Serial Nos. 347,161 and 347,162, filed April 6, 1953, wherein an alkylene carbonate, such as ethylene carbonate, is employed to replace all or a portion of the glycol, may be employed in the practice of the present invention.

The polyester compositions described herein are particularly adapted for use in the manufacture of shaped articles, such as filaments, fibers, films, and the like by the wet-spinning process. In forming filaments, the polyester solution is extruded through a spinneret submerged in a liquid medium comprising an aliphatic alcohol or dioxane, said medium being a non-solvent for the said polyester. Thereafter, the filaments are removed from the liquid medium or coagulating bath, washed free of coagulant, stretched if desired, and dried, in conventional manner. If desired, the filaments can be cut into staple fibers using standard equipment, such as a Beria type cutter. In the case of forming filaments, an aqueous coagulating bath is preferred wherein the alcohol or dioxane, or like non-solvent, is employed in concentrations of 10 to 100%. Films may be formed in like manner by conventional procedures by extruding the polyester solution or dope through an elongated slot into a coagulating medium, as defined above. Further, films can be cast from the polyester solutions of the instant invention by casting a film on a continuous stainless steel belt or on a rotating wheel or drum having a smooth metal surface which in turn is immersed in a coagulating bath, as described above. The films may also be formed on the stainless steel belt or wheel by solvent evaporation and thereafter stripped from the casting support.

While in many instances it is desirable to heat the polyester in the solvent to effect complete solution in the shortest possible time in order to avoid any discoloration due to prolonged heating, the solutions are stable at room temperature for prolonged periods.

Further details of the practice of this invention are set forth with respect to the following examples, which are merely intended to be illustrative and not limitative. In the examples, all parts and percent are by weight, unless otherwise indicated.

*Example I*

A mixture was formed containing 2 parts of polyethylene terephthalate, which had a melt viscosity of 1000 poises, and 20 parts of trichloronitropropanol. The mixture was warmed to a temperature of 80° C. with stirring. Any type agitation would be suitable. After 15 minutes a clear, homogeneous and viscous solution was obtained containing 9% of polyethylene terephthalate. The solution was extruded, in conventional manner, into a bath of aqueous methanol and a bath of aqueous dioxane. In each case, filaments were formed which were tough and pliable. The polyethylene terephthalate olution thus obtained was also capable of being cast into tough, tenacious films.

*Example II*

In this example, a tube was charged with 10 parts of o-chlorophenol and 10 parts of trichloronitropropanol and the contents heated to 50° C. whereupon complete miscibility of the two compounds was achieved. Thereafter, 2.5 parts of polyethylene terephthalate, having a melt viscosity of 1400 poises, were added to the solvent mixture. The mixture was stirred and heated to 80° C. After a period of 15 minutes a clear, homogeneous, viscous solution or "dope" was obtained containing 11% polyethylene terephthalate. The polymer was precipitated from the solution when the same was poured into methanol, dioxane, or an aqueous methanol solution (50–50 by volume). The polymer solution or dope was stable for at least 16 hours at room temperature.

*Example III*

A tube was charged with 15 parts of trichloronitropropanol and 5 parts of mono-chloro-acetic acid and the mixture heated to 50° C. to achieve complete miscibility. 2.5 parts of polyethylene terephthalate (melt viscosity=1400 poises) were added to the solvent mixture and thereafter the mixture was heated to 100° C. with stirring. After one hour a clear, homogeneous and viscous solution was obtained containing 11% of polyethylene terephthalate. The polymer was precipitated upon pouring the polymer solution into methanol, dioxane or aqueous methanol. The polymer solution was stable at room temperature for at least 16 hours.

Example IV

A solvent mixture containing 15 parts of trichloronitropropanol and 5 parts of dibromochloromethane was prepared by mixing and warming to 50° C. To the solvent mixture, 3 parts of polyethylene terephthalate were added and the mixture stirred and heated to 80° C. After one hour, a clear, homogeneous, viscous solution resulted which contained 13% of polyethylene terephthalate. The polymer was precipitated from the solution by pouring into aqueous methanol, methanol or dioxane. The "dope" or polymer solution was stable for at least 16 hours at room temperature.

Example V

A tube was charged with 10 parts of trichloronitropropanol, 10 parts of phenol, and 3 parts of polyethylene terephthalate (melt viscosity=2000 poises). Thereafter, the charge was heated, with stirring, to 60° C. After 15 minutes, a clear, viscous and homogeneous solution was obtained containing 13% polyethylene terephthalate. The polymer precipitated upon pouring into methanol, dioxane or aqueous methanol. The polymer solution was stable for at least 16 hours at room temperature.

Example VI

The procedure of Example V was repeated using 5 parts of polyethylene terephthalate and heating to 80° C. for 15 minutes. The clear, homogeneous polymer solution obtained contained 20% polyethylene terephthalate.

Example VII

A charge of 5 parts of trichloronitropropanol, 15 parts of dibromochloromethane and 2.5 parts of polyethylene terephthalate (melt viscosity=400 poises) was placed in a tube, stirred and heated to 100° C. After one hour, a clear, homogeneous solution was obtained. The polymer were precipitated in methanol, dioxane and aqueous methanol. The polymer solution was stable at room temperature.

When it is desirable to produce shaped articles from the polyester compositions of the instant invention which have a modified appearance or modified properties, various agents to accomplish these effects may be added to the polyester solutions prior to fabrication of the articles without any ill effects thereon. For example, various plasticizers, pigments, dyes, and the like may be added, as well as fire retarding agents, anti-static agents, etc.

The polyester compositions can be usefully employed in the coating field, for example, in the coating of textile fabrics. Thus, a fabric can be coated and/or impregnated with the polyester solutions described herein and then treated, e. g. soaked, in a non-solvent for the polyester in order to precipitate the polyester in and on the fabric. Metals, paper and impervious films may also be coated with the polymer compositions of this invention by conventional and well-known procedures.

Various other agents may be added to the instant polyester compositions, such as delusterants, waxes, oils, water-repellants, anti-oxidants, corrosion inhibitors, and the like, and particularly useful ingredients or agents for the purpose of increasing the stability of the polymer when exposed for long periods to sunlight or elevated temperatures are the various stabilizing agents.

One of the principal advantages of the instant invention is that it provides polyester compositions which are readily convertible to useful shaped articles by the wet-spinning method which is more economical than the dry-spinning or melt-spinning methods. Numerous other advantages of this invention will be apparent to those skilled in the art from reading the instant description.

As many apparently widely different embodiments of this invention may be made without departing from the spirit and scope thereof, it is to be understood that the same is not limited to the specific embodiments thereof except as defined in the appended claims.

We claim:

1. A new composition of matter comprising a solution of a synthetic linear condensation polyester formed by the reaction of a dicarboxylic acid and at least one glycol of the series $HO(CH_2)_nOH$, where $n$ is an integer greater than one and not exceeding 10, and a solvent selected from the group consisting of 1,1,1-trichloro-3-nitro-2-propanol and mixtures of 1,1,1-trichloro-3-nitro-2-propanol and a compound selected from the group consisting of halogenated paraffin hydrocarbons containing from 1 to 6 carbon atoms, phenol, m-cresol, o-chlorophenol, and halogen-substituted fatty acids containing from 2 to 4 carbon atoms, said halogen being selected from the group consisting of chlorine and bromine.

2. A new composition of matter as defined in claim 1 wherein the polyester is polyethylene terephthalate.

3. A new composition of matter as defined in claim 1 wherein the solvent is a mixture of 1,1,1-trichloro-3-nitro-2-propanol and phenol.

4. A new composition of matter as defined in claim 1 wherein the solvent is a mixture of 1,1,1-trichloro-3-nitro-2-propanol and m-cresol.

5. A new composition of matter as defined in claim 1 wherein the solvent is a mixture of 1,1,1-trichloro-3-nitro-2-propanol and monochloroacetic acid.

6. A new composition of matter as defined in claim 1 wherein the solvent is a mixture of 1,1,1-trichloro-3-nitro-2-propanol and dibromochloromethane.

7. A new composition of matter as defined in claim 1 wherein the solvent is 1,1,1-trichloro-3-nitro-2-propanol.

8. A new composition of matter as defined in claim 7 wherein the polyester is polyethylene terephthalate.

9. A new composition of matter comprising a homogeneous solution of 5 to 30% polyethylene terephthalate having a molecular weight of at least 10,000 and 1,1,1-trichloro-3-nitro-2-propanol.

10. A process for preparing a new composition of matter comprising mixing a polyester formed by the reaction of a dibasic acid and at least one glycol of the series $HO(CH_2)_nOH$, where $n$ is an integer greater than one and not exceeding 10, with a solvent selected from the group consisting of 1,1,1-trichloro-3-nitro-2-propanol and mixtures of 1,1,1-trichloro-3-nitro-2-propanol and a compound selected from the group consisting of halogenated paraffin hydrocarbons containing from 1 to 6 carbon atoms, phenol, m-cresol, o-chlorophenol, and halogen-substituted fatty acids containing from 2 to 4 carbon atoms, said halogen being selected from the group consisting of chlorine and bromine, and heating said mixture to a temperature in the range of 50° C. to the boiling point of the solvent while agitating the mixture.

11. The process as defined in claim 10 wherein the solvent is 1,1,1-trichloro-3-nitro-2-propanol.

12. The process as defined in claim 10 wherein the solvent is a mixture of 1,1,1-trichloro-3-nitro-2-propanol and phenol.

13. The process as defined in claim 10 wherein the solvent is a mixture of 1,1,1-trichloro-3-nitro-2-propanol and m-cresol.

14. The process as defined in claim 10 wherein the solvent is a mixture of 1,1,1-trichloro-3-nitro-2-propanol and mono-chloroacetic acid.

15. The process as defined in claim 10 wherein the solvent is a mixture of 1,1,1-trichloro-3-nitro-2-propanol and dibromochloromethane.

16. The process as defined in claim 10 wherein the polyester is polyethylene terephthalate.

17. The process as defined in claim 16 wherein the solvent is 1,1,1-trichloro-3-nitro-2-propanol.

18. A process for preparing a homogeneous fiber-forming solution which comprises mixing polyethylene terephthalate having a molecular weight of at least 10,000 with 1,1,1-trichloro-3-nitro-2-propanol and heating said mixture at a temperature in the range of 50° to 120° C. while agitating the mixture, said polyethylene terephthalate being employed in an amount to give 5 to 30% by weight in the finished composition.

References Cited in the file of this patent

UNITED STATES PATENTS 2,743,250   Sweet _____ Apr. 24, 1956

FOREIGN PATENTS 609,947   Great Britain _____ Oct. 8, 1948

OTHER REFERENCES

Durrans: Solvents (1950), pages 170, 171.